United States Patent
Ueda et al.

(10) Patent No.: US 6,240,896 B1
(45) Date of Patent: Jun. 5, 2001

(54) DIESEL ENGINE FUEL INJECTION CONTROL DEVICE AND FUEL INJECTION CONTROL METHOD

(75) Inventors: Takahiro Ueda; Long Zhang, both of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/288,273

(22) Filed: Apr. 8, 1999

(30) Foreign Application Priority Data

Apr. 10, 1998 (JP) .................................................. 10-099522

(51) Int. Cl.[7] .................................................. F02D 41/04
(52) U.S. Cl. .......................... 123/299; 123/300; 123/295
(58) Field of Search .................................. 123/299, 300, 123/480, 491, 295

(56) References Cited

U.S. PATENT DOCUMENTS

| | | | |
|---|---|---|---|
| 3,646,917 | * 3/1972 | Nagy | 123/491 |
| 4,535,743 | 8/1985 | Igashira et al. | 123/472 |
| 4,542,725 | * 9/1985 | Yasuhara | 123/299 |
| 4,639,871 | * 1/1987 | Sakai et al. | 701/113 |
| 4,782,803 | * 11/1988 | Kikuchi | 123/300 |
| 5,231,962 | * 8/1993 | Osuka et al. | 123/299 |
| 5,402,760 | * 4/1995 | Takeuchi et al. | 123/300 |

FOREIGN PATENT DOCUMENTS

| | | | |
|---|---|---|---|
| 0 570 986 | 11/1993 | (EP) . | |
| 949413 | * 10/1999 | (EP) . | |
| 62-58034 | * 3/1987 | (JP) . | |
| 62-058034 | 3/1987 | (JP) . | |
| 62-267546 | * 11/1987 | (JP) . | |
| 62-271940 | 11/1987 | (JP) . | |
| 01-155053 | 6/1989 | (JP) | F02D/41/40 |
| 10-280978 | * 10/1998 | (JP) . | |
| 11-93735 | * 4/1999 | (JP) . | |

* cited by examiner

*Primary Examiner*—Henry C. Yuen
*Assistant Examiner*—Hieu T. Vo
(74) *Attorney, Agent, or Firm*—McCormick, Paulding & Huber LLP

(57) ABSTRACT

An arrangement for controlling diesel engine fuel injection including a first sensor that detects engine temperature and a second sensor that detects outside air temperature. An associated electronic control unit adjusts the amount of advance of pilot injection timing relative to main injection timing based on the difference between the engine temperature and the outside air temperature. Since the amount of advance is determined based on the engine temperature and the outside air temperature, the warmup state of an engine is considered in determining the amount of advance. This means that differences in the temperature inside an engine cylinder are considered. Accordingly, it is possible to obtain an optimum amount of advance.

15 Claims, 4 Drawing Sheets

DIESEL ENGINE FUEL INJECTION CONTROL DEVICE AND FUEL INJECTION CONTROL METHOD

BACKGROUND OF THE INVENTION

1. Field of the Invention

The present invention relates to a diesel engine fuel injection control device and a fuel injection control method that carries out a small pilot injection before a main injection of fuel.

2. Description of the Related Art

With conventionally known technology, in a diesel engine, a small pilot injection is carried out in advance of the main injection of fuel followed by the suppressing combustion noise and the generation of NOx.

In the meantime, in a diesel engine, the cylinder temperature at the end of compression stroke is low when the engine is cold such as during low temperature starts making it easy for white exhaust to occur that contains fuel which has not yet undergone combustion as the main component. Because of this, when the water temperature (equivalent to engine temperature) is low in a device disclosed in Japanese Patent Application Kokai (Laid-Open Publication) No. 1-155053, in order to suppress the generation of noise, NOx and white smoke (gas which has not yet undergone full combustion), the pilot injection timing is advanced with the main injection timing remaining fixed without change and an increased portion of the ignition delay of the pilot injection fuel is compensated for.

If the pilot injection timing is advanced, it is assumed that the generation of white smoke will be suppressed due to the following reasons. Namely, by carrying out an advance, it is assumed that the peak of heat generation rate due to combustion will almost match top dead center (TDC) and the temperature inside a cylinder will increase up to a maximum temperature achievable in this state and in addition, because the engine will operate at maximum efficiency, the quantity of fuel that is used will be at a minimum and the portion of the fuel that will not undergo combustion will correspondingly be reduced.

However, the above-mentioned conventional device also has problems for the following reasons.

Namely, in this fuel injection control apparatus for a diesel engine, control is carried out by determining the amount the pilot injection timing is advanced based on the engine's cooling water temperature only and then specifically increasing the amount of advance with the low temperature.

The inventors measured the density of white smoke within the exhaust gas with a PHS smoke meter under the following conditions: (1) when the water temperature was 0° C. and the outside air temperature was 0° C., and (2) when the water temperature was 0° C. and the outside air temperature was −10° C. The result of this experiment indicated that the density of the white smoke was less for (2).

The condition (1) represents a case where the water temperature and the outside air temperature are the same, i.e., when the engine was just started, and the condition (2) represents a case where the water temperature is higher than the outside air temperature, i.e., during engine warmup. From this it has been concluded that the latter had a smaller occurrence of white smoke with the same water temperature. This conclusion is considered to be due to the fact that the temperature inside an engine cylinder is higher during engine warmup with the same water temperature compared to directly after an engine start because the water temperature increases following increases in the temperature inside a cylinder leading to a state in which combustion can occur easily.

In the above-mentioned conventional arrangement, because the amount of advance is determined from the water temperature only, the amount of advance is identical for both (1) and (2). Therefore, if the amount of advance is set to conform to the state in (1), i.e., if the amount of advance is determined to suit a "directly-after-engine-start" situation, the value of advancement will not be suitable during engine warmup. In contrast, if the amount of advance is set to conform to the state in (2), i.e., if the amount of advance is determined to suit to a "during-engine-warmup" condition, the value of advancement will then not be suitable to directly after an engine start. For the former, pilot fuel is completely combusted before the compressive top dead center during engine warmup worsening the fuel consumption because of pumping loss during compression. For the latter, the ignition is delayed and the effect of suppressing the white smoke directly after an engine start is lessened. Because differences in the temperature inside a cylinder could not be considered in this type of conventional fuel injection control apparatus without distinguishing the case directly after an engine start and the case during engine warmup, it does not always follow that sufficient control can be carried out.

SUMMARY OF THE INVENTION

The object of the present invention is to provide optimum pilot injection timing that takes into consideration differences in the temperature inside a cylinder and an engine warmup state during engine warmup.

Another object of the present invention is to reliably distinguish the engine into a state directly after an engine start or a state during engine warmup and then execute optimum pilot injection period control in response to the difference in those states.

Another object of the present invention is to prevent worsening of fuel consumption and the generation of white smoke during engine warmup.

The diesel engine fuel injection control device according to the present invention comprises a first sensor that detects engine temperature, a second sensor that detects outside air temperature, and an electronic control unit that controls the amount of advance of pilot injection timing with respect to main injection 'timing based on the temperature difference of the engine temperature and the outside air temperature detected by these sensors.

According to this device, since the amount of advance is controlled based on the engine temperature and the outside air temperature, the warmup state of the engine is considered and therefore differences in the temperature inside a cylinder are considered making it possible to obtain an optimum amount of advance.

It is preferable for the engine temperature to be represented by engine cooling water temperature and for the first sensor to be a water temperature sensor that detects the engine cooling water temperature.

It is also preferable for the outside air temperature to be represented by the intake air temperature of the engine and for the second sensor to be an intake air temperature sensor that detects the intake air temperature.

Preferably, the electronic control unit is configured to subtract the outside air temperature from the engine temperature to calculate the temperature difference, and to increase the amount of advance as the temperature difference becomes smaller.

Preferably, the electronic control unit is configured to execute control of the amount of advance based on the temperature difference when the outside air temperature is lower than a predetermined value (threshold value).

It is further preferable for the electronic control unit to adjust the amount of advance based on the temperature difference when the engine is operating at idle. Moreover, it is preferable for the electronic control unit to not execute control of the amount of advance based on the temperature difference when the outside air temperature exceeds a fixed value even if the engine is operating at idle. At that time, the electronic control unit may rather determine the amount of advance from a previously stored map based on the engine rotation speed and the total fuel injection quantity. In this case, this determined amount of advance may preferably be smaller than the amount of advance obtainable from the temperature difference.

It is further preferable for the electronic control unit to execute control of the amount of advance based on the temperature difference while the engine is operating at idle and when the outside air temperature is less than a fixed value. In this case, the pilot injection quantity may be set to an amount greater than the pilot injection quantity while the engine is operating at idle and when the outside air temperature exceeds the fixed value. The pilot injection quantity set to the great amount may be made a fixed value.

It is further preferable for the electronic control unit to calculate the temperature difference by subtracting the outside air temperature from the engine temperature and interrupt control of the amount of advance based on the temperature difference when the temperature difference exceeds a predetermined value. The predetermined value may be set to a value that increases as the outside air temperature falls. Preferably, the interruption of control of the amount of advance based on the temperature difference may be carried out while the engine is operating at idle.

Preferably, the electronic control unit may calculate the temperature difference by reducing the outside air temperature from the engine temperature and interrupt control of the amount of advance based on the temperature difference when the engine operation time reaches a fixed time and the fixed time being set to a period that is elongated as the outside air temperature becomes lower. Preferably, the interruption of control of the amount of advance based on the temperature difference to may be carried out while the engine is operating at idle.

A method of controlling fuel injection of a diesel engine according to the present invention comprises the first step of detecting the engine temperature and the outside air temperature and the second step of controlling the amount of advance of the pilot injection timing with respect to the main injection timing based on the temperature difference of the engine temperature and the outside air temperature.

Preferably, the temperature difference may be calculated by subtracting the outside air temperature from the engine temperature in the second step, and the amount of advance may increase as the temperature difference becomes smaller.

Preferably, the temperature difference may be calculated by subtracting the outside air temperature from the engine temperature in the second step, and the method may further include the third step of interrupting control of the amount of advance based on the temperature difference either when the temperature difference exceeds a predetermined value or when the engine operation period reaches a predetermined time.

DETAILED DESCRIPTION OF THE INVENTION

In the following, an embodiment of the present invention will be described with reference to the attached drawings.

Figure 1:
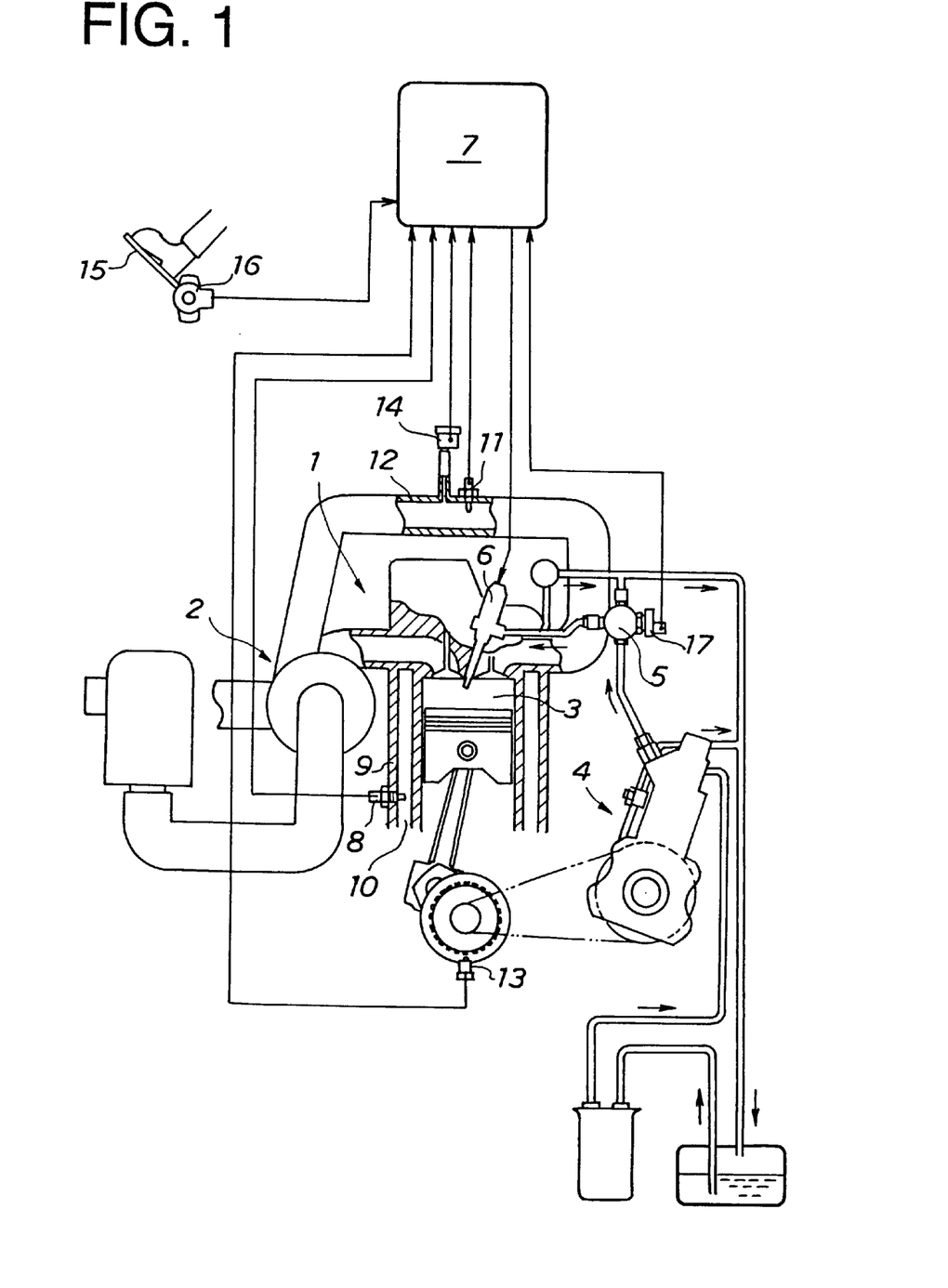
FIG. 1 schematically illustrates an arrangement for controlling diesel engine fuel injection according to an embodiment of the present invention.

Referring to FIG. 1, illustrated is a fuel injection control device for a diesel engine 1 according to the present invention. This diesel engine 1 has one or more cylinders 3 but only one cylinder is depicted in the drawing. The diesel engine 1 is provided with a turbocharger 2 and supplies supercharged air (intake air) into the cylinder 3 utilizing exhaust energy. A "common rail" technique or arrangement is employed for the diesel engine fuel injection control device here. This device stores fuel, which is pressurized to a high pressure by a high pressure pump 4, in a common rail 5 and then injects the fuel from a unit injector 6. The unit injector 6 is operated based on control signals sent from an electronic control unit 7 (hereinafter referred to as ECU). In other words, ECU 7 determines an optimum injection timing and injection quantity in response to the current operating state of the engine and then controls the valve opening action of the unit injector 6 to match this injection timing and injection quantity.

This device is provided with an engine temperature detection means that detects engine temperature, namely, a water temperature sensor 8 that detects the temperature of engine cooling water. Here, the engine temperature is represented by the cooling water temperature. Alternatively, it is possible to mount (or place) a temperature sensor to (or in) the oil pan or oil gallery and take the oil temperature for the engine temperature. The detector portion of the water temperature sensor 8 protrudes inside a water jacket 10 of a cylinder block 9.

This device is further provided with an outside air temperature detection means that detects outside air temperature, namely, an intake air temperature sensor 11 that detects the intake air temperature. The outside air temperature is represented by the intake air temperature here. Alternatively, it would be also possible to mount a temperature sensor on an outer surface of the engine 1 (or other appropriate location of another element) and directly detect the outside air temperature. The detector portion of the intake air temperature sensor 11 protrudes inside an intake air tube 12.

In addition, this device is provided with an engine rotation speed sensor 13 that detects the engine rotation speed, an intake air pressure sensor 14 that detects the intake air pressure, an accelerator sensor 16 that detects the amount of pressing an accelerator 15 (accelerator stamping stroke), and a common rail pressure sensor 17 that detects the common rail pressure. All of the outputs from these sensors are fed to ECU 7.

ECU 7 determines a target fuel injection quantity and target injection timing based on the current engine running conditions (mainly the engine rotation speed and the amount the accelerator is stamped) and then controls the opening action of the unit injector 6 in response to this. At the same time, ECU 7 may compensate the target injection quantity and timing based on other information such as water temperature if necessary.

Further, ECU 7 causes the fuel injector 6 to carry out a small pilot injection in advance of the main injection of fuel. In other words, ECU 7 determines the target fuel injection quantities and timing for both of the pilot injection and the main injection based on the operating state of the engine and then controls the opening action of the unit injector 6 to match this. Thus, the valve of the unit injector 6 is opened in two different manners (will be described later).

In particular, ECU 7 executes the following warmup control during the period from engine start to engine warmup.

Figure 2:
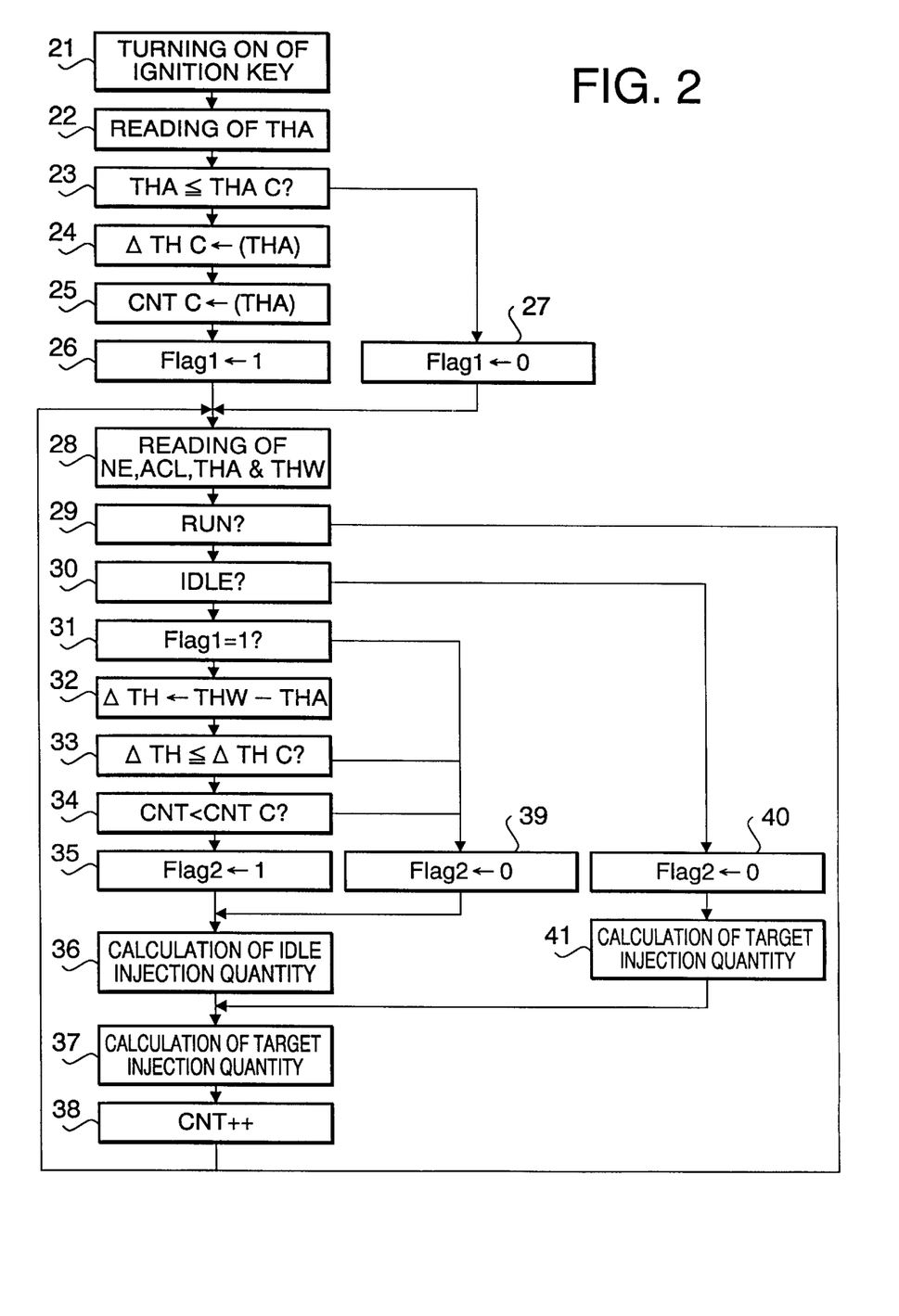
FIG. 2 is a flowchart showing details of warmup control and in particular, a flowchart of a main routine.

Referring to FIG. 2, illustrated is a flowchart showing details of the warmup control and in particular, a flowchart of a main routine. At first, when the ignition key is turned ON at initial step 21, ECU 7 is initialized. The output value of the intake air temperature sensor 11 (outside air temperature THA) is then read into ECU 7 in the next step 22. In the subsequent steps ECU 7 carries out the following processing.

Figure 6:
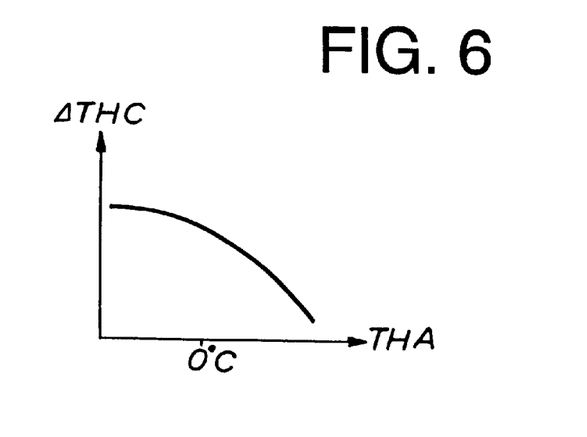
FIG. 6 is a table showing the relationship between outside air temperature and temperature difference threshold value.

To begin, in step 23, the current outside air temperature THA is compared to a predetermined temperature THA C (for example, app. 20° C.) that has been previously stored in ECU 7. When THA≦THA C, the process proceeds to step 24 and when THA>THA C, the process proceeds to step 27. In step 24, a fixed value ΔTH C that corresponds to the current outside air temperature THA is referenced following the table of FIG. 6 that has been previously stored in ECU 7. Here, the fixed value ΔTH C is a threshold value for the temperature difference between the water temperature and outside air temperature (will be described later) and is referred to as "temperature difference threshold value" hereinafter. As shown in the figure, the temperature difference threshold value ΔTH C is set to a value that increases (higher temperature) as the outside air temperature THA becomes lower.

Figure 7:
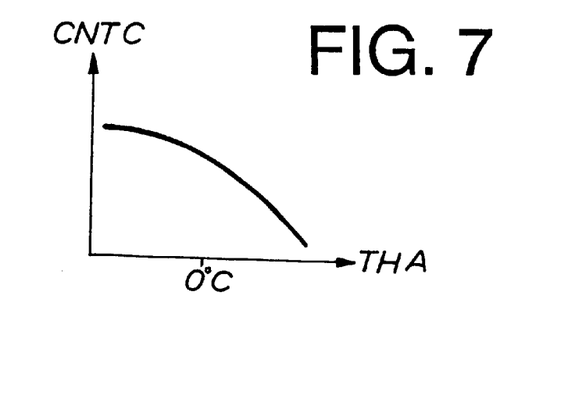
FIG. 7 is a table showing the relationship between outside air temperature and time threshold value.

Next, in step 25, another fixed value CNT C that corresponds to the current outside air temperature THA is referenced following the table of FIG. 7 that has been previously stored in ECU. Here, the fixed value CNT C is a threshold value for an engine operation time (will be described later) and is called a time threshold value hereinafter. In like manner to the temperature difference threshold value ΔTH C, the time threshold value CNT C is also set to a value that increases (longer time) as the outside air temperature THA drops.

Next, the process proceeds to step 26 and the outside air temperature judgment flag 1 sets to a value of 1. Because THA>THA C in step 27, the judgment flag 1 has a value of 0 (zero) and clears. The above processing is carried out almost simultaneously when the ignition key is turned ON. The starter (not shown) is actuated thereafter thereby starting the engine 1.

Subsequent steps 28 to 41 are loop processes which repeat every fixed time period (for example, period of 30 msec). At first, in the initial step 28, ECU 7 reads engine rotation speed NE, accelerator stamping stroke ACL, outside air temperature THA and water temperature THW from the output of the engine rotation speed sensor 13, accelerator sensor 16, intake air temperature sensor 11 and water temperature sensor 8, respectively. Next, in step 29, a judgment is made from the value of engine rotation speed NE to determine whether the engine is currently operating under its own power (RUN) or after a complete high-order detonation. When the judgment is that the engine is currently operating under its own power, the process proceeds to step 30. An internal timer begins counting from the time when this judgment judges that the engine is currently operating under its own power. The initial value of count value CNT is 0 (zero). In contrast, when the judgment is that the engine is not currently operating under its own power, it means that the engine is stopped or the starter is rotating. Therefore, the process will return to step 28 in order to wait until the engine starts operating under its own power.

In step 30, a judgment is made from the value of engine rotation speed NE and accelerator stamping stroke ACL to determine whether the engine is operating in idle (IDLE). When the judgment is that the engine is operating in idle, the process proceeds to step 31. In contrast, when the judgment is that the engine is not operating in idle, the process proceeds to step 40.

In step 31, it is determined whether the outside air temperature judgment flag 1 is at a value of 1. If the value is 1, the process proceeds to step 32 and if the value is 0 (zero), the process proceeds to step 39.

In step 32, the temperature difference between the water temperature and the outside air temperature is calculated. Specifically, the outside air temperature THA is subtracted from the water 'temperature THW and the resulting value is taken as the temperature difference ΔTH (=THW−THA).

In step 33, the calculated temperature difference ΔTH is compared to the above-mentioned temperature difference threshold value ΔTH C. If ΔTH<ΔTH C, the process proceeds to step 34 and if ΔTH>ΔTH C, the process proceeds to step 39.

In step 34, the count value CNT is compared to the time threshold value CNT C. If CNT<CNT C, the process proceeds to step 35 and if CNT≧CNT C, the process proceeds to step 39.

In step 35, another flag, namely, temperature difference-based control judgment flag 2 sets to a value of 1. Further, in step 39, that flag clears to 0 (zero). When it is determined that the engine is not operating in idle in step 30, the flag 2 also clears in step 40. The program advances from step 40 to step 41 and the target injection quantity of fuel is calculated. This calculation executes in a subroutine described later. Thereafter, in step 37, the target injection timing is calculated.

The program proceeds to step 36 after step 35/39. In step 36, calculations for a target fuel injection quantity suitable for engine idle warmup operation, namely, idle injection quantity, is calculated. The target injection timing is then calculated in the next step 37. These calculations execute in a subroutine described later.

When the injection quantity of fuel and injection timing have been determined in this manner, the count value CNT counts up in step 38. Thereafter, returning to step 28 the above-described processing repeats.

Figure 3:
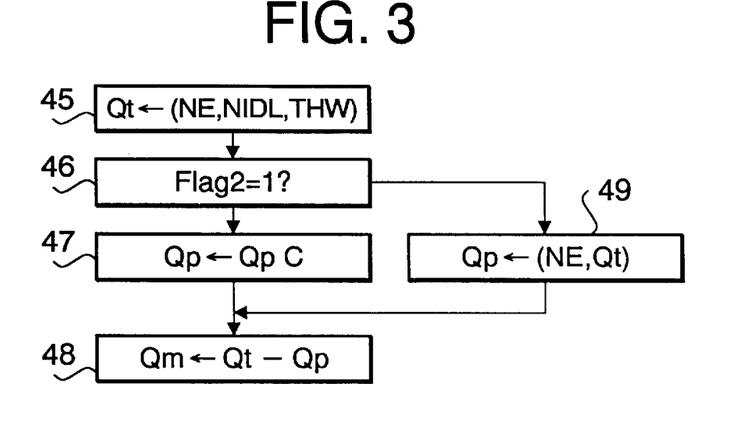
FIG. 3 shows a flowchart of a sub-routine used in a calculation of a target injection quantity during idle.

Referring to FIG. 3, illustrated is a flowchart of a calculation processing carried out in step 36. In initial step 45, ECU 7 calculates a total fuel injection quantity Qt (sum of pilot injection quantity and main injection quantity) from the engine rotation speed NE, deviation (NIDL-NE) of the target idle rotation speed NIDL (stored value), and water temperature THW. Then, in subsequent step 46, a judgment is made to determine whether temperature difference-based control judgment flag 2 is a value of 1. If the flag is a value of 1, the process proceeds to step 47 and if the value is 0 (zero), the process proceeds to step 49. In step 47, a pilot injection quantity Qp sets to a previously stored fixed value Qp C. In contrast, in step 49, based on a previously stored map (not shown in the figure), the pilot injection quantity Qp is calculated from the engine rotation speed NE and the total fuel injection quantity Qt. The fixed value Qp C is set to be slightly larger than the pilot injection quantity Qp calculated in step 49. After the pilot injection quantity Qp is calculated in this manner, the pilot injection quantity Qp is subtracted from the total fuel injection quantity Qt in step 48 to calculate the main injection quantity Qm.

Figure 4:
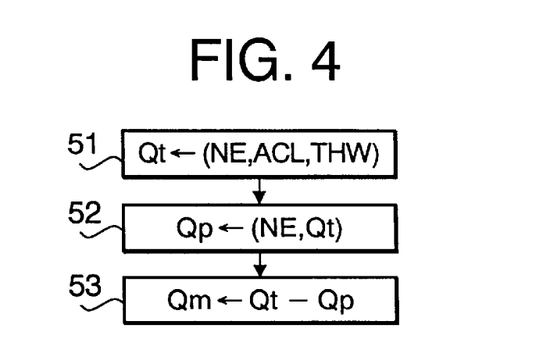
FIG. 4 shows a flowchart of a sub-routine used in a calculation of a target injection quantity during non-idle.

FIG. 4 shows a flowchart of a calculation processing carried out in step 41. In initial step 51, based on a previously stored map (not shown in the figure), ECU 7 calculates a base injection quantity from the engine rotation speed NE and the accelerator stamping stroke ACL, compensates it in consideration of the water temperature THW etc. and then calculates the total fuel injection quantity Qt. Then, in subsequent step 52, based on a previously stored map (not shown in the figure), the pilot injection quantity Qp is calculated from the engine rotation speed NE and the total fuel injection quantity Qt. After the pilot injection quantity Qp is calculated in this manner, the pilot injection quantity Qp is subtracted from the total fuel injection quantity Qt in step 53 to calculate the main injection quantity Qm.

Figure 5:
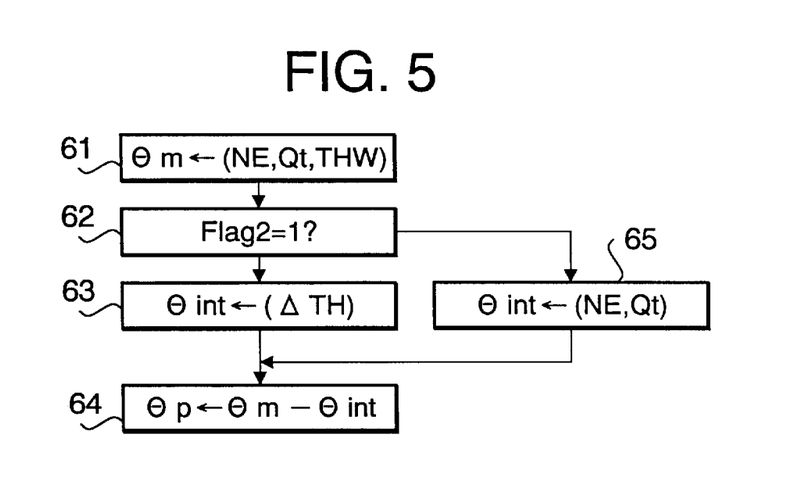
FIG. 5 shows a flowchart of a sub-routine used in a calculation of a target injection timing.

FIG. 5 illustrates a flowchart of a calculation processing carried out in step 37. The timing between the main injection and the pilot injection is calculated here. This calculation is carried out with a base (0) for top dead center (TDC) and a positive after top dead center (ATDC) and a negative before top dead center (BTDC). In initial step 61, based on a previously stored map (not shown in the figure), ECU 7 calculates a base main injection timing from the engine rotation speed NE and the total fuel injection quantity Qt, compensates it in accordance to the water temperature THW etc. and then calculates main injection timing Em. In subsequent step 62, a judgment is made to determine whether the temperature difference-based control judgment flag 2 is a value of 1. If the flag is a value of 1, the process proceeds to step 63 and if the value is 0 (zero), the process proceeds to step 65.

Figure 8:
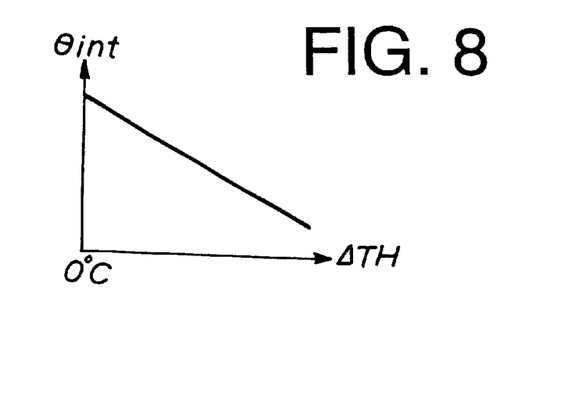
FIG. 8 is a table showing the relationship between temperature difference and pilot interval.

In step 63, the amount of advance of the pilot injection timing relative to the main injection timing $\Theta m$, i.e., pilot interval $\Theta int$, is calculated from the temperature difference $\Delta TH$ based on the table shown in FIG. 8. Here, the pilot interval $\Theta int$ is set to a value that increases as the temperature difference $\Delta TH$ is reduced. In contrast, in step 65, based on a previously stored map (not shown in the figure), the pilot interval $\Theta int$ is calculated from the engine rotation speed NE and the total fuel injection quantity Qt. After the pilot interval $\Theta int$ is calculated in this manner, the pilot interval $\Theta int$ is subtracted from the main injection timing $\Theta m$ in step 64 to calculate the pilot injection timing $\Theta p$.

The pilot interval $\Theta int$ calculated in step 63 is set to be larger than the pilot interval $\Theta int$ calculated in step 65. This makes the pilot injection timing $\Theta p$ advanced when the temperature difference-based control judgment flag 2 is set, as compared to when it is not set.

After the injection quantity and injection timing of the pilot injection and the main injection are determined in this manner, the valve opening action of the unit injector 6 is controlled to match these injection quantities and injection timing thereby performing two-stage (pilot and main) fuel injection.

In this way, in this device, the amount of advance $\Theta int$ of the pilot injection timing $\Theta p$ with respect to the main injection timing $\Theta m$ is controlled based on the temperature difference $\Theta TH$ between the engine temperature (water temperature THW) and the outside air temperature THA (see steps 32 and 63; hereinafter referred to as temperature difference-based control). This makes it possible to consider differences in the warmup state of the engine and in turn differences in temperature inside the engine cylinder, and represent the temperature inside the cylinder even more accurately, thereby allowing an optimum amount of advance to be obtained. It should be recalled that if a situation directly after an engine start is compared to that during engine warmup, the temperature inside the cylinder is higher in the latter situation even if the water temperature is the same, and therefore the combustion takes easier in the latter situation. By performing the control based on the temperature difference, such a fact can be taken into consideration, making is possible to obtain an optimum pilot injection timing. Accordingly it is feasible to prevent excessive advance or insufficient advance as well as prevent worsening in fuel consumption and the occurrence of white smoke. Moreover, although the outside air temperature is reduced from the water temperature to obtain the temperature difference here, this can also be reversed.

In this device ECU 7 forms a pilot injection timing control means of the present invention.

Because the amount of advance $\Theta int$ increases as the temperature difference $\Delta TH$ becomes smaller in this device (see FIG. 8), the pilot injection timing is more advanced in a case where a sufficient period does not pass in the warmup condition (only a short period elapses after the startup and therefore combustion becomes difficult). Consequently, the original benefits of a pilot injection can be used to their maximum.

Even further, in this device, when the temperature difference $\Delta TH$ exceeds the temperature difference threshold value $\Delta TH$ C, namely, when the engine temperature is sufficiently elevated, the control based on the temperature difference will be interrupted (see step 33). Here, the temperature difference threshold value $\Delta TH$ C is a value that grows larger as the outside air temperature THA becomes lower (see FIG. 6).

Specifically, when the engine is warmed to a certain degree and expels substantially no white smoke, it is necessary that the control based on the temperature difference will be interrupted and switched to normal pilot injection control. On the other hand, the cylinder temperature at the end of compression stroke becomes lower as the outside air temperature falls even with the same engine temperature, so that if the engine temperature (temperature inside the engine cylinder) does not increase more, the occurrence of white smoke will not be eliminated. In the present invention, therefore, the temperature difference-based control is interrupted depending upon the temperature difference threshold value $\Delta TH$ C determined as a function of the outside air temperature THA. This allows for the switching to the normal control under optimum conditions. Further, because the temperature difference threshold value $\Delta TH$ C is obtained as described above, the upper limit value of the engine temperature wherein the temperature difference-based control is carried out is increased as the outside air temperature THA becomes lower. Because of this, the occurrence of white smoke can be reliably prevented. It should be noted that the temperature difference threshold value may be determined such that the upper limit value is fixed and lowering of the outside air temperature itself is only considered in determining the temperature difference threshold value.

With the same concept as above, when the engine operating time reaches a prescribed time, namely, when the count value CNT (representing the time the engine operates under its own power) reaches the time threshold value CNT C (see step 34), the control depending upon the temperature difference is terminated and that prescribed time (time threshold value CNT C) is set to a value with a period that becomes longer as the outside air temperature THA falls (see FIG. 7). By adjusting the time threshold value CNT C in this manner, the temperature difference-based control is performed for a longer period as the outside air temperature THA becomes lower which in turn raises the upper limit value of the engine temperature for the temperature difference-based control, thereby making it possible to reliably prevent the occurrence of white smoke. It should also be noted that only dropping of the outside air temperature itself may be considered in determining the time threshold value.

Although one of these two interruption judgments may only be employed in a certain application, utilizing both (OR state) ensures more reliable prevention of the occurrence of white smoke.

In the foregoing description, when executing the control based on the temperature difference, namely, when the temperature difference-based control judgment flag 2 is set (see step 35), the pilot fuel injection quantity is set to the fixed value Qp C (see step 47). It should be noted however that, the pilot fuel injection quantity may be obtained from a map with the engine rotation speed NE and the total fuel injection quantity Qt being the parameters, as when the control based on the temperature difference is not executed (step 49). For this case, the pilot fuel injection quantity is preferably slightly greater than the pilot fuel injection quantity Qp of when the control based on the temperature difference is not executed.

As described above, the temperature difference-based control judgment flag 2 is utilized to determine whether or not the control based on the temperature difference should execute. Specifically, if this flag is set, the pilot injection will be carried out with an amount of advance and injection quantity larger than normal and in particular, the amount of advance will be optimally controlled in response to the temperature difference. In contrast, if this flag is cleared, the pilot injection will take place normally based on the engine rotation speed NE and the total fuel injection quantity Qt (see steps 49, 51 to 53 and 65).

Other than the above described control, calculation of a target pressure for the common rail 5 and other processing are executed in this device. The control for the common rail target pressure is for example disclosed in a co-pending U.S. patent application Ser. No. 09/136,078, filed Aug. 18, 1998 entitled "SUPPLY PUMP FOR COMMON RAIL FUEL INJECTION SYSTEM", the entire disclosure of which is herein incorporated by reference. Further, when the engine is not operating under its own power (see step 29), other controls are carried out to start the engine. In short, the fuel injection control device of the present invention can also carry out normal control operations other than those above.

In the foregoing although a particular mode of operation of the present invention was described, the present invention can also utilize other modes of operation.

This application claims priority of Japanese Patent Application No. 10-99522 filed on Apr. 10, 1998. The entire disclosures of the above-mentioned Japanese Patent Application is incorporated herein by reference.

What is claimed is:

1. An apparatus for controlling fuel injection for a diesel engine, comprising:

engine temperature detection means for detecting engine temperature;

outside air temperature detection means for detecting outside air temperature; and pilot injection timing control means for controlling an amount of advance of pilot injection timing relative to main injection time based on the temperature difference between the engine temperature and the outside air temperature, wherein said pilot injection timing control means calculates said temperature difference by subtracting the outside air temperature from the engine temperature, with said amount of advance increasing as said temperature difference becomes smaller.

2. The apparatus according to claim 1, wherein said pilot injection timing control means calculates said temperature difference by reducing the outside air temperature from the engine temperature and interrupts control of the amount of advance based on said temperature difference when an engine operation period reaches a predetermined value, the predetermined value having a larger value as the outside air temperature drops.

3. An apparatus for controlling fuel injection for a diesel engine, comprising:

engine temperature detection means for detecting engine temperature;

outside air temperature detection means for detecting outside air temperature; and pilot injection timing control means for controlling an amount of advance of pilot injection timing relative to main injection time based on the temperature difference between the engine temperature and the outside air temperature, wherein said pilot injection timing control means calculates said temperature difference by subtracting the outside air temperature from the engine temperature and interrupts control of the amount of advance based on the temperature difference when said temperature difference exceeds a predetermined value, said predetermined value being set to a value that increases as said outside air temperature drops.

4. A diesel engine fuel injection control device comprising:

a first sensor that detects engine temperature;

a second sensor that detects outside air temperature; and an electronic control unit that controls an amount of advance of pilot injection timing with respect to main injection timing based on the temperature difference between the engine temperature and the outside air temperature detected by said first and second sensors, wherein said electronic control unit subtracts the outside air temperature from the engine temperature to calculate said temperature difference and increases said amount of advance as said temperature difference becomes smaller.

5. The diesel engine fuel injection control device according to claim 4, wherein said electronic control unit executes control of the amount of advance based on said temperature difference when said outside air temperature is not greater than a predetermined value.

6. The diesel engine fuel injection control device according to claim 4, wherein said electronic control unit executes control of the amount of advance based on said temperature difference when an engine is operating at idle.

7. The diesel engine fuel injection control device according to claim 6, wherein said electronic control unit does not execute control of the amount of advance based on said temperature difference when said outside air temperature exceeds a predetermined value even if an engine is operating at idle and at that time determines said amount of advance from a previously stored map based on engine rotation speed and total fuel injection quantity with this determined amount of advance being smaller than an amount of advance which would be obtained based on said temperature difference.

8. The diesel engine fuel injection control device according to claim 4, wherein said electronic control unit executes control of the amount of advance based on said temperature difference while an engine is operating at idle and when said outside air temperature is not greater than a predetermined value, with pilot injection quantity at that time being set to an amount greater than pilot injection quantity which would be obtained while an engine is operating at idle and when said outside air temperature exceeds said predetermined value.

9. The diesel engine fuel injection control device according to claim 8, wherein said pilot injection quantity set to said greater amount is made a fixed value.

10. The diesel engine fuel injection control device according to claim 4, wherein said electronic control unit reduces the outside air temperature from the engine temperature to calculate said temperature difference and interrupts control of the amount of advance based on the temperature difference when said temperature difference exceeds a predetermined value, and said predetermined value is set to a value that increases as said outside air temperature falls.

11. The diesel engine fuel injection control device according to claim 10, wherein the interruption of control of the amount of advance based on said temperature difference is carried out while the engine is operating at idle.

12. The diesel engine fuel injection control device according to claim 4, wherein said electronic control unit reduces the outside air temperature from the engine temperature to calculate said temperature difference and interrupts control of the amount of advance based on said temperature difference when an engine operation period reaches a predetermined time, said predetermined time being set to a period that is elongated as said outside air temperature becomes lower.

13. The diesel engine fuel injection control device according to claim 12, wherein the interruption of control of the amount of advance based on said temperature difference is carried out while engine is operating at idle.

14. A method of controlling diesel engine fuel injection, comprising the steps of:

A) detecting engine temperature and outside air temperature; and

B) controlling an amount of advance of pilot injection timing relative to main injection timing based on the temperature difference between the engine temperature and the outside air temperature detected by the step A, wherein said temperature difference is calculated by reducing the outside air temperature from the engine temperature in the step B, with said amount of advance increasing as said temperature difference becomes smaller.

15. A method of controlling diesel engine fuel injection, comprising the steps of:

A) detecting engine temperature and outside air temperature; and

B) controlling an amount of advance of pilot injection timing relative to main injection timing based on the temperature difference between the engine temperature and the outside air temperature detected by the step A, wherein said temperature difference is calculated by reducing the outside air temperature from the engine temperature in the step B and the method further includes the step of interrupting control of the amount of advance based on the temperature difference when either said temperature difference exceeds a predetermined value or when an engine operation period reaches a predetermined time.

* * * * *